United States Patent Office 3,380,910
Patented Apr. 30, 1968

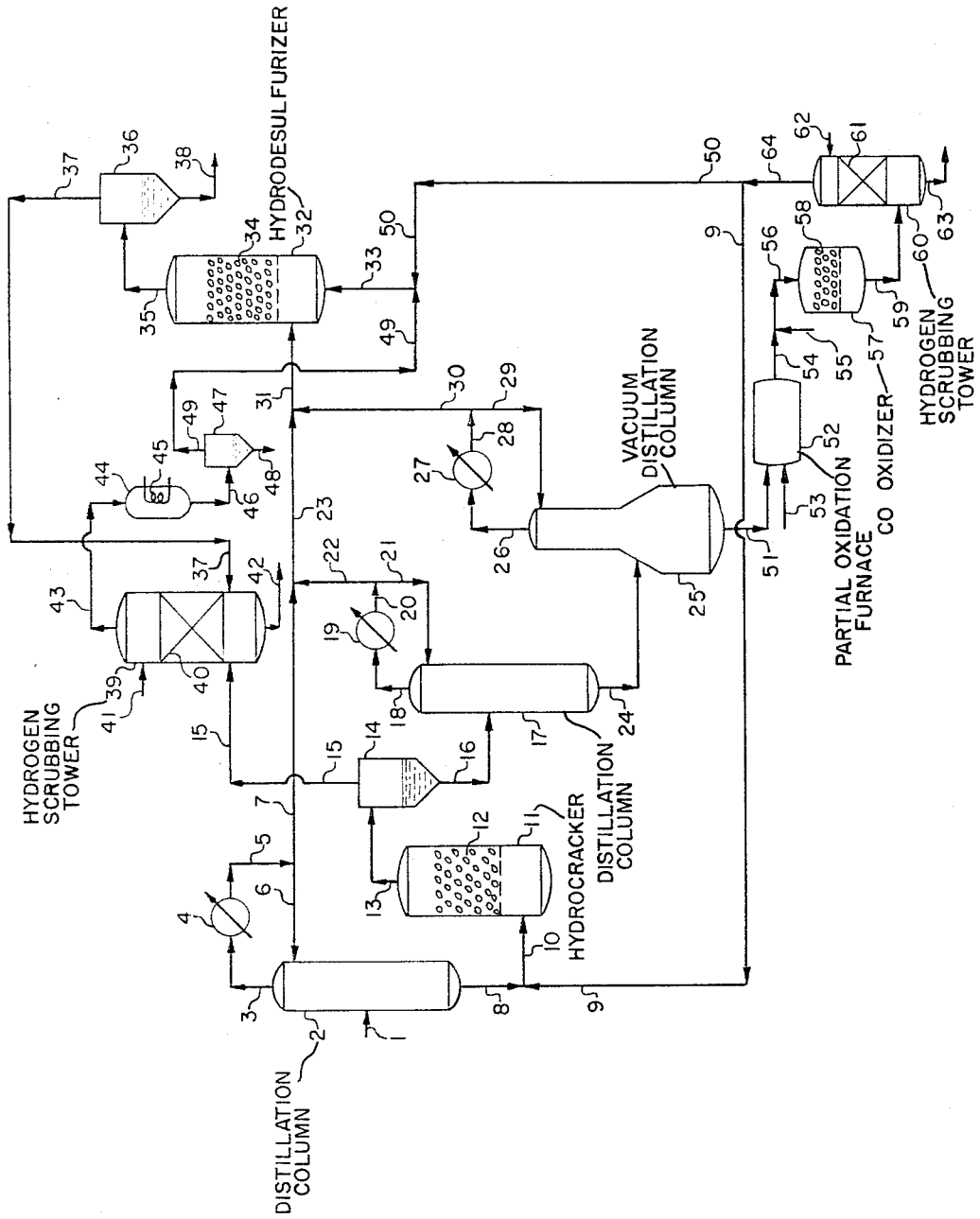

3,380,910
PRODUCTION OF SYNTHETIC CRUDE OIL
Graham N. Griffiths, Old Greenwich, Conn., assignor to Chemical Construction Corporation, New York, N.Y.
Filed May 17, 1966, Ser. No. 550,760
9 Claims. (Cl. 208—58)

ABSTRACT OF THE DISCLOSURE

A sulfur-containing heavy crude oil is converted into light synthetic crude oil which is free of sulfur and heavy residuals, and which is therefore of greater economic value. The heavy crude oil is initially distilled, to produce a low-boiling overhead fraction and heavy residual bottoms. The residual bottoms are hydrocracked, and a hydrogen purge stream containing hydrogen sulfide is produced, together with a liquid oil phase containing short-chain molecules, which is distilled to yield a low boiling overhead phase and a final residual liquid phase. The overhead phase is combined with the initial low-boiling overhead fraction, and the combined low boiling overhead stream is subjected to hydrodesulfurization, with the resultant removal of sulfur and the production of a second hydrogen purge stream containing hydrogen sulfide. The final liquid product from hydrodesulfurization is a light synthetic crude oil of high API gravity and is of high economic value, since it is substantially free of residuals and sulfur. The hydrogen purge streams are scrubbed with a suitable liquid absorbent for the removal of hydrogen sulfide, and the purified hydrogen is recycled. In most instances, the purified recycle hydrogen will be concentrated by cryogenic or other procedures for removal of inerts such as gaseous light hydrocarbons, prior to recycle to the hydrocracking or hydrodesulfurization procedures. The final heavy residual liquid phase produced after distillation of the hydrocracking effluent stream is passed to a partial oxidation procedure, for the production of make-up hydrogen.

---

The present invention relates to the processing of petroleum. A procedure is provided for the upgrading of crude oil, by means of which a heavy crude oil, usually containing sulfur and of low economic value, is converted to a light distillate-type synthetic crude oil, which is substantially free of sulfur and heavy residuals, and which is of greatly increased economic value compared to the original heavy crude oil.

Numerous petroleum deposits exist which contain crude oil which is of low economic value, due to the presence of a large proportion of sulfur in the crude oil. In many instances the crude oil is also of heavy consistency with low API gravity, and contains a large proportion of high-boiling residuals such as asphaltenes and metals in the form of organometallic compounds. In such cases, the sulfur-containing heavy crude oil is of low economic value in terms of utility in petroleum refining to produce conventional refinery products such as gasoline, and in some instances the heavy crude oil is of such low quality that the particular deposit cannot be profitably worked and the wells are shut-in. In other cases, the oil field produces crude oil only in periods of great market demand. In any event, such crude oils are of marginal economic value in conventional petroleum refining, and in many instances such crude oils must be blended with a higher grade crude oil or refinery stock prior to being subjected to the usual petroleum refining procedures. The processing of such heavy crude oils by conventional refining techniques usually results in the production of a substantial proportion of heavy residual or Bunker C fuel oil, which is employed as a marine fuel or for heating purposes. Many communities have recently adopted stringent air pollution restrictions, which preclude the usage of heavy residuals or Bunker C oils for heating purposes, in order to prevent the pollution of the atmosphere with fly ash, soot and sulfur dioxide. Also the metallic compounds can be very detrimental to the life of furnace components. Thus, the principal economic value of a major end product from the refining of heavy crude oils has decreased in recent years.

Numerous procedures have been developed for the efficient and economical refining of crude petroleum, in order to produce desired end products of different boiling ranges such as kerosene, gasoline, naphtha, light fuel oil, gas oil and lubricating oil. In one of these procedures, known as hydrocracking and described in U.S. Patents Nos. 3,207,689; 3,207,688; 3,175,966; 3,136,712 and others, the crude oil is contacted with hydrogen at elevated temperature and in the presence of a suitable catalyst such as combinations of metals from groups 6 and 8 of the periodic table in various proportions supported on a suitable carrier or base such as alumina, silica-alumina, natural or artificial clays, fluorided alumina or alumina-zirconia. Suitable catalysts for use on such bases include for instance cobalt, iron, molybdenum, tungsten, nickel, rhenium, platinum, palladium, etc., as well as combinations of the same. Such catalysts may be used in the oxide or sulfide forms either alone or together with other suitable catalysts and may be present in the reaction zone in any suitable form such as in the form of a fixed bed, an ebulliated or fluid bed, or in the form of a slurry. The contact of the crude oil with the catalytic agent at elevated temperature results in the cracking of the longer-chain molecules to shorter-chain molecules, which may initially contain unsaturated carbon-carbon linkage. Due to the presence of hydrogen, a concomitant saturation of the molecules takes place, and the resultant product stream contains the desired end products of the process such as gasoline, naphtha, kerosene and fuel oil. Thus, hydrocracking has been essentially applied in the prior art as a petroleum refining step or unit process, in order to produce desired refinery end products.

Another important refinery procedure, known as hydrodesulfurization and described in U.S. Patents Nos. 3,206,-395; 3,206,389; 3,193,495 and others, involves the removal of contained or organic sulfur from a hydrocarbon such as a petroleum refinery stream by mixing the sulfur-laden hydrocarbon with hydrogen, and passing the mixture in contact with a suitable desulfurization catalyst such as siliceous catalysts including silica-alumina, platinum-alumina, chromia, molybdenum trioxide, nickel molybdate supported on alumina, nickel-tungstate-alumina, cobalt-molybdate-alumina, or nickel-cobalt-molybdate. The sulfur impurities in the hydrocarbon are hydrogenated to produce hydrogen sulfide, which is evolved as a product of the process. The resulting petroleum refinery stream, now free of sulfur, is separated from the residual hydrogen-hydrogen sulfide mixture. When the hydrocarbons are in the vapor state, separation is attained by cooling and selective condensation. The hydrodesulfurization procedure may also take place by processing a refinery stream in the liquid state, however vapor phase reaction is generally preferred, due to the greater speed and completion of the reaction.

Both hydrocracking and hydrodesulfurization require large quantities of hydrogen. Hydrogen may be produced from the lighter hydrocarbons such as methane or naphtha by catalytic steam reforming, however hydrogen may also be produced from heavier hydrocarbons by the partial oxidation procedure, such as is described in U.S. Patents Nos. 2,809,104; 2,818,326; 2,684,896 and others. In this procedure, the heavy hydrocarbon is reacted non-catalytically with oxygen at elevated temperature, usually with steam being also added as a reaction component. The resulting crude synthesis gas, principally containing hydrogen, carbon monoxide and carbon dioxide, is subjected to the catalytic carbon monoxide oxidation reaction, in which carbon monoxide is reacted with steam to produce further hydrogen and carbon dioxide. The resulting gas stream is scrubbed with a suitable carbon dioxide absorbent such as aqueous monoethanolamine or potassium carbonate solution, to yield product hydrogen gas.

In the present invention, a sulfur containing heavy crude oil is converted into a light synthetic crude oil which is free of sulfur and heavy residuals and is of much greater market value than the original heavy crude oil. The heavy crude oil is initially distilled, to produce a low-boiling overhead fraction and heavy residual bottoms. The residual bottoms are hydrocraked, and a hydrogen purge stream containing hydrogen sulfide is produced, together with a liquid oil phase containing short-chain molecules, which is distilled to yield a low boiling overhead phase and a final resdual liquid phase. The overhead phase is combined with the low boiling overhead fraction obtained from initial distillation of the crude oil, and the combined low boiling overhead stream is subjected to hydrodesulfurization, with the resultant removal of sulfur and the production of a second hydrogen purge stream containing hydrogen sulfide. The hydrodesulfurization of the low boiling overhead fraction may be carried out in the vapor phase, and the hydrodesulfurization of the low boiling overhead phase from the hydrocracking step may be separately hydrodesulfurized in the liquid state, followed by combination of the two desulfurized streams to produce a final product. The final product is a light synthetic crude oil of high API gravity, substantially free of residuals and sulfur, and of high economic value. The hydrogen purge streams are scrubbed with a suitable liquid absorbent for the removal of hydrogen sulfide, and the resultant purified hydrogen is recycled. The final residual liquid phase produced after distillation of the hydrocracking effluent stream is passed to a partial oxidation procedure, for the production of make-up hydrogen. The distillation of the liquid effluent from the hydrocracking procedure will generally take place in two stages, with an initial atmospheric distillation to produce a low boiling overhead phase and a residual liquid phase, and a vacuum distillation of the residual liquid phase from the atmospheric distillation to produce further low boiling overhead phase and the final residual liquid phase. In most instances, the purified recycle hydrogen will be concentrated for removal of inerts such as gaseous light hydrocarbons, prior to recycle to the hydrocracking or hydrodesulfurization procedures.

The process of the present invention possesses several important advantages. A principal advantage is that a heavy crude oil is economically and completely converted to synthetic crude oil of greater economic value. Another advantage is that the procedure is self-sustaining with regard to hydrogen requirements, due to utilization of the final residual oil in a partial oxidation procedure for the production of make-up hydrogen. Finally, the sulfur content of the heavy crude oil is removed and recovered as hydrogen sulfide, which is readily converted to valuable elemental sulfur by the Claus process.

It is an object of the present invention to provide a process for the upgrading of crude oil.

Another object is to efficiently and economically convert a sulfur-containing heavy crude oil into a light distillate type synthetic crude oil which is substantially free of sulfur and heavy residual components.

A further object is to increase the economic value of sulfur-containing heavy crude oil.

An additional object is to produce a purified light synthetic crude oil from sulfur-containing heavy crude oil by a process including hydrocracking and hydrodesulfurization, in which the requisite hydrogen is generated within the process.

Still another object is to convert heavy crude oil into light synthetic crude oil free of a residual fraction, without any reduction in oil volume.

Still a further object is to remove and recover sulfur from a sulfur-containing heavy crude oil in a useful form as hydrogen sulfide, which is readily converted to elemental sulfur.

These and other objects and advantages of the present invention will become evident from the description which follows. Referring to the figure, which is a flowsheet of a preferred embodiment of the present invention, heavy crude oil stream 1 containing sulfur and residuals and of low API gravity is passed into initial distillation column 2, in which a low boiling overhead fraction is separated from heavier residual bottoms. A distillation temperature generally below 550° C. and typically in the range of 250° C. to 550° C. is maintained in unit 2, with the resultant production of low boiling overhead vapor stream 3 at a temperature below 550° C. Stream 3 is condensed to liquid in cooler 4, and the resulting low boiling overhead liquid stream 5 is divided into reflux stream 6 which is recycled to unit 2, and a low boiling overhead portion stream 7 is passed to further processing to be described infra.

A residual liquid portion stream 8 is also produced by unit 2. Stream 8 contains high boiling components such as long chain hydrocarbons and residuals, as well as most of the sulfur-containing components originally present in stream 1. Liquid stream 8 is now combined with hydrogen stream 9, and the mixed process stream 10 is passed into hydrocracking unit 11, and flows through catalyst bed 12. An elevated temperature typically in the range of 300° C. to 550° C. is maintained in unit 11, and due to the provision of catalyst bed 12 and elevated temperature, the hydrocracking process takes place in unit 11, with lower boiling and shorter chain length hydrocarbons being formed with components of stream 8, and with the resultant unsaturated carbon linkages in the lower boiling hydrocarbons being subsequently hydrogenated and saturated due to the presence of hydrogen in unit 11. In addition, most of the sulfur in the sulfur-containing components of stream 8, principally consisting of organically bound sulfur, is converted to hydrogen sulfide in unit 11. The resultant hydrocracked process stream 13 discharged from unit 11 is passed into gas-liquid separator 14, which is a conventional apparatus for the separation of gaseous and liquid phases, such as a baffled or cyclonic unit. Residual gaseous hydrogen purge stream 15 containing hydrogen sulfide is separated within unit 14 from the liquid phase stream 16 containing lower boiling hydrocarbons produced in unit 11, and stream 15 is passed to further processing to be described infra.

Stream 16 is passed into distillation column 17, in which a low boiling overhead fraction is separated from heavier residual bottoms. Substantially atmospheric pressure will usually be maintained in unit 17, as well as a distillation temperature generally below 350° C. A low boiling overhead vapor stream 18 is generated by unit 17 at a temperature generally below 350° C. Stream 18 is condensed to liquid in cooler 19, and the resulting low boiling overhead liquid stream 20 is divided into reflux stream 21 which is recycled to unit 17, and low boiling overhead portion stream 22 which is combined with stream 7 to form stream 23.

A residual liquid portion stream 24 is also produced by unit 17. Stream 24 contains residual higher boiling hydrocarbons and residual material not converted in unit 11, and is passed into vacuum distillation unit 25, in which a sub-atmospheric pressure is maintained in order to evolve higher boiling hydrocarbons. In addition, a more highly elevated temperature is provided in unit 25 than in unit 17, thus the temperature in unit 25 will generally be below 550° C. A low boiling overhead vapor stream 26 containing relatively higher boiling hydrocarbons is generated by unit 25 at a temperature generally below 550° C. and typically in the range of 250° to 550° C. Stream 26 is condensed to liquid in cooler 27, and the resulting overhead liquid stream 28 is divided into reflux stream 29 which is recycled to unit 25, and overhead portion stream 30 which is combined with stream 23 to form stream 31.

The combined overhead portions stream 31 now consists of a high synthetic distillate-type crude oil, essentially free of residual components, however stream 31 contains a proportion of organically bound sulfur in the form of sulfur-containing components. Stream 31 is passed into catalytic hydrodesulfurization unit 32 for final sulfur removal. Process hydrogen stream 33 is also passed into unit 32, and the process stream mixture flows through catalyst bed 34. An elevated temperature typically in the range of 300° C. to 550° C. is maintained in unit 32, and due to the provision of catalyst bed 34 and elevated temperature, the hydrodesulfurization process takes place in unit 32, with the conversion of substantially all of the residual organically bound sulfur to hydrogen sulfide. The resultant hydrodesulfurized process stream 35 discharged from unit 32 is passed into gas-liquid separator 36, which is a conventional apparatus for the separation of gaseous and liquid phases and may be similar to unit 14 described supra. Residual unreacted gaseous hydrogen purge stream 37 containing hydrogen sulfide is separated within unit 36 from the liquid phase stream 38. Stream 38 now consists of product light synthetic crude oil of a distillate type, substantially free of residuals and sulfur and of high API gravity.

The gaseous hydrogen purge stream 15 and 37 containing hydrogen sulfide are now processed for the removal of hydrogen sulfide, prior to recycle to the process. Streams 15 and 37 are passed into gas scrubbing tower 39 below gas-liquid contact section 40, which may consist of a bed of spherical or Raschig rings packing, bubble cap trays, sieve trays, or other suitable gas-liquid contact means. The hydrogen purge gas streams containing hydrogen sulfide flow upwards through section 40, countercurrent to the liquid absorbent solution stream 41 which is admitted into unit 39 above section 40. Stream 41 consists of any suitable selective hydrogen sulfide absorbent, such as aqueous monoethanolamine solution, aqueous potassium carbonate solution or water. The resulting hydrogen sulfide-laden solution stream 42 discharged from unit 39 below section 40 is processed by means not shown, such as by heating at reduced pressure, to evolve concentrated hydrogen sulfide gas and produce a regenerated solution which is recycled via stream 41. The hydrogen sulfide gas is readily converted to produce elemental sulfur by the Claus process.

The resulting purified hydrogen gas stream 43 discharged from unit 39 above section 40 is now substantially free of hydrogen sulfide, however stream 43 usually contains inerts such as gaseous light hydrocarbons including methane, which must be at least partially removed from stream 43 prior to hydrogen recycle in order to prevent inerts buildup in the system. The separation of inerts from stream 43 may be attained in various ways, however this separation is preferably attained by a cryogenic method, in which stream 43 is cooled to a sufficiently low temperature to attain selective condensation of inerts to the liquid state. Stream 43 is passed into heat exchange cooler-condenser 44, in which the gas stream is cooled to a low temperature by heat exchange with a refrigerant fluid circulated through coil 45. A concomitant condensation of inerts to the liquid state takes place in unit 44, and the resulting mixed gas-liquid stream 46 is passed to separator 47, which may be a gas-liquid separation unit of design similar to unit 14 described supra. The condensed liquid phase is separated and removed from unit 47 as stream 48, which may be utilized as fuel or passed to product utilization as product crude light hydrocarbon mixture.

The gaseous phase stream 49 removed from unit 47 now consists of purified hydrogen substantially free of hydrogen sulfide and of low inerts content. Stream 49 is now recycled for further utilization in units 32 or 11, and is preferably combined with make-up hydrogen stream 50 to form stream 33.

Returning to unit 25, the final residual liquid portion not vaporized in the vacuum distillation procedure is removed from unit 25 as stream 51, which generally contains high-boiling residuals such as tars and asphaltenes. Stream 51 is utilized in the production of make-up hydrogen for the process, and is passed into partial oxidation furnace 52 together with oxygen stream 53. A stream of steam, not shown, may also be passed into unit 52. The resulting crude synthesis gas stream 54 discharged from unit 52 principally contains hydrogen, carbon monoxide and carbon dioxide. Stream 54 is quenched to a lower temperature by the injection of liquid stream 55, which will usually consist of water. The resulting cooled process stream 56 is passed into catalytic carbon monoxide oxidation unit 57, which is provided with a catalyst bed 58 and attains the catalytic reaction between carbon monoxide and water vapor to produce further hydrogen and carbon dioxide. A typical arrangement of unit 57 in which multi-bed conversion is attained is described in U.S. Patent No. 3,010,807. The resulting gas stream 59 discharged from unit 57 principally contains hydrogen and carbon dioxide, and is passed into gas scrubber 60 below gas-liquid contact section 61. The section 61 may be any conventional type of gas-liquid contact means, such as section 40 described supra. The carbon dioxide-containing hydrogen stream flows upwards through section 61, countercurrent to the liquid absorbent solution stream 62 which is admitted into unit 60 above section 61. Stream 62 consists of any suitable selective carbon dioxide absorbent, such as aqueous monoethanolamine solution or aqueous potassium carbonate solution. The resulting carbon dioxide-laden solution stream 63 discharged from unit 60 below section 61 is processed by means not shown, such as by heating at reduced pressure, to evolve carbon dioxide and produce a regenerated solution which is recycled via stream 62. The purified make-up hydrogen gas stream 64 discharged from unit 60 above section 61 is now substantially free of carbon dioxide, and is divided into streams 9 and 50.

Numerous alternatives within the scope of the present invention will occur to those skilled in the art. Thus, the ranges of process variables such as temperature and pressure recited supra are merely preferred ranges or limitations of these operating variables for optimum utilization of the process concepts of the present invention, with the exception of the upper limitation of 550° C. for a distillation temperature, which is necessary in order to produce a light distillate-type crude oil without residuals carry-over and also in order to avoid any possibility of cracking during distillation.

The overhead vapor phases streams 3, 18 and 26 were initially condensed to liquid in the description supra, and the respective liquid streams were then divided into reflux and product portions. As an alternative, streams 3, 18 and 26 could each be initially divided into two portions, with one portion being condensed and refluxed, and the other portion passing to the product stream 31. In this case, stream 31 would consist of vapor rather than liquid and the resulting gaseous stream 35 discharged from unit 32 would be initially cooled to attain selective condensation of product liquid light crude oil, prior to passing stream 35 to unit 36.

The distillation of the hydrocracked stream 16 may alternatively take place in more than two stages, or may even be attained in one distillation stage. In this latter alternative, unit 25 could be omitted with stream 24 passing directly to unit 52. More preferably, unit 17 could be omitted, with stream 16 passing directly to unit 25. A portion of stream 15 may be added to stream 10 and recycled to unit 11. In addition, a portion of stream 51 may also be added to stream 10 and recycled to unit 11 in suitable instances.

The hydrogen balance for the system will be empirically determined in practice, depending on the particular characteristics of the crude oil stream 1 being processed. Thus, in some instances, stream 49 may alternatively be partially or totally recycled by adding stream 49 to stream 8, in which case stream 49 would be partially or totally employed in unit 11. In this case, stream 9 may be omitted, with all of stream 64 passing via streams 50 and 33 to unit 32. Similarly, depending on empirical conditions, stream 50 may be omitted in suitable instances, with all of stream 64 passing via streams 9 and 10 to unit 11.

Finally, in some cases the functions of the separate units 39 and 60 may be alternatively attained by the provision of a single gas scrubbing unit, which would remove both hydrogen sulfide and carbon dioxide from the combined streams 15, 37 and 59. The resultant single purified hydrogen stream would then be processed for inerts removal, and divided into two separate streams which would then be passed to units 11 and 32 respectively. In some instances, as for example when only a minor amount of inerts generation takes place, inerts removal from the system may be attained by a periodic purge of recycle hydrogen, and units 44 and 47 may be omitted. In this case, stream 43 would be directly recycled to units 32 or 11.

An example of an industrial application of the process of the present invention will now be described.

Example

The process of the present invention was applied to the conversion of a heavy crude oil stream of 13.3° API gravity and containing 1% sulfur and asphaltenes in the high-boling back end. This material was converted into high-quality synthetic crude oil of 30° API gravity, free of sulfur and asphaltenes and with essentially no components boiling above 540° C. There was a net gain in volume of crude oil, and the final value of the product light crude oil was about $3.50 per barrel, compared to an initial value of about $2.00 per barrel for the original heavy crude oil.

Following are the flow rates and temperatures of the principal process streams.

| Process Stream No. | Flow Rate, Barrels per Stream Day | Temperature, °C. |
|---|---|---|
| 1 | 30,000 | |
| 7 | 7,500 | 340 |
| 8 | 22,500 | 340 |
| 22 | 4,840 | 200 |
| 30 | 15,870 | 525 |
| 38 | 30,210 | |
| 51 | 3,040 | 525 |

I claim:
1. A process for the production of a synthetic distillate crude oil substantially free of sulfur and heavy residuals, and of high API gravity, from a heavy crude oil of low API gravity and containing organically bound sulfur and asphaltenes which comprises:
  (a) distilling said organic sulfur-containing heavy crude oil at a temperature in the range of 250° C. to 550° C., to produce a low boiling overhead portion and a residual liquid portion,
  (b) catalytically hydrocracking the residual liquid portion from step (a) by contacting said residual liquid portion with hydrogen at a temperature in the range of 300° C. to 550° C. and in the presence of a catalyst, whereby lower boiling hydrocarbons are formed from a portion of said residual liquid portion, said lower boiling hydrocarbons are hydrogenated, and a major portion of said organically bound sulfur is converted to hydrogen sulfide,
  (c) separating a residual gaseous hydrogen purge stream containing hydrogen sulfide from the resulting liquid phase containing lower boiling hydrocarbons derived from step (b),
  (d) distilling said resulting liquid phase from step (c) at a temperature in the range of 250° C. to 550° C., to produce a low boiling overhead portion and a residual liquid portion,
  (e) combining the low boiling overhead portions from steps (a) and (d) to form a combined overhead stream containing residual organically bound sulfur,
  (f) mixing hydrogen with the combined overhead stream from step (e),
  (g) hydrodesulfurizing the mixed stream formed by step (f) by contacting said mixed stream with a catalyst at a temperature in the range of 300° C. to 550° C., whereby substantially all of the residual organically bound sulfur is converted to hydrogen sulfide,
  (h) separating the resulting stream produced by step (g) into a liquid product stream consisting of synthetic distillate crude oil substantially free of sulfur, asphaltenes, and components boiling above 540° C., and residual gaseous hydrogen purge stream containing hydrogen sulfide,
  (i) scrubbing said residual gaseous hydrogen purge streams from steps (c) and (h) with a liquid solvent, to selectively remove hydrogen sulfide and form a recycle hydrogen stream substantially free of hydrogen sulfide,
  (j) reacting said residual liquid portion from step (d) with oxygen in a partial oxidation sequence to produce a crude synthesis gas, and
  (k) converting said crude synthesis gas from step (j) to produce make-up hydrogen.

2. The process of claim 1, in which said distillation step (d) is carried out in two stages of partial distillation at successively reduced pressure levels, to produce first and second low boiling overhead portions, said first and second overhead portions being combined with the overhead portion from step (a) to form the combined overhead stream of step (e).

3. The process of claim 2, in which the first stage of partial distillation is at substantially atmospheric pressure, and the second stage of partial distillation is at a subatmospheric pressure.

4. The process of claim 3, in which said first stage of partial distillation is at a temperature below 350° C., and said second stage of partial distillation is at a temperature below 550° C.

5. The process of claim 1, in which the liquid solvent of step (i) is selected from the group consisting of water, aqueous monoethanolamine solution, and aqueous potassium carbonate solution.

6. The process of claim 1, in which said recycle hydrogen stream substantially free of hydrogen sulfide formed by step (i) is concentrated for inerts removal, prior to recycle.

7. A process for the production of a synthetic distillate crude oil substantially free of sulfur and heavy residuals, and of high API gravity, from a heavy crude oil of low API gravity and containing organically bound sulfur and asphaltenes which comprises
  (a) distilling said organic sulfur-containing heavy crude oil at a temperature in the range of 250° C. to 550° C., to produce a low boiling overhead portion and a residual liquid portion,
  (b) catalytically hydrocracking the residual liquid portion from step (a) by contacting said residual liquid portion with hydrogen at a temperature in the range of 300° C. to 550° C. and in the presence of a catalyst, whereby lower boiling hydrocarbons are formed from a portion of said residual liquid portion, said lower boiling hydrocarbons are hydrogenated, and a major portion of said organically bound sulfur is converted to hydrogen sulfide, (c) separating a residual gaseous hydrogen purge stream containing hydrogen sulfide from the resulting liquid phase containing lower boiling hydrocarbons derived from step (b), (d) distilling said resulting liquid phase from step (c) at a temperature below 350° C. and substantially atmospheric pressure, to produce a low boiling overhead portion and a residual liquid portion, (e) distilling said residual liquid portion from step (d) at a temperature in the range of 250° C. to 550° C. and a sub-atmospheric pressure, to produce a low boiling overhead portion and a final residual liquid portion, (f) combining the overhead portions from steps (a), (d) and (e) to form a combined overhead stream containing residual organically bound sulfur, (g) mixing hydrogen with the combined overhead stream from step (f), (h) hydrodesulfurizing the mixed stream formed by step (g) by contacting said mixed stream with a catalyst at a temperature in the range of 300° C. to 550° C., whereby substantially all of the residual organically bound sulfur is converted to hydrogen sulfide, (i) separating the resulting stream produced by step (h) into a liquid product stream consisting of synthetic distillate crude oil substantially free of sulfur, asphaltenes, and components boiling above 540° C., and residual gaseous hydrogen purge stream containing hydrogen sulfide, (j) scrubbing said residual gaseous hydrogen purge stream from steps (c) and (i) with a liquid solvent, to selectively remove hydrogen sulfide and form a recycle hydrogen stream substantially free of hydrogen sulfide, (k) reacting said final residual liquid portion from step (e) with oxygen in a partial oxidation sequence to produce a crude synthesis gas, and (l) converting said crude synthesis gas from step (k) to produce make-up hydrogen.

8. The process of claim 7, in which the liquid solvent of step (j) is selected from the group consisting of water, aqueous monoethanolamine solution, and aqueous potassium carbonate solution.

9. The process of claim 7, in which said recycle hydrogen stream substantially free of hydrogen sulfide formed by step (j) is concentrated for inerts removal, prior to recycle.

References Cited

UNITED STATES PATENTS

| | | | |
|---|---|---|---|
| 2,894,897 | 7/1959 | Post | 708—111 |
| 2,949,420 | 8/1960 | Eastman et al. | 208—80 |
| 3,228,871 | 1/1966 | Schlinger | 208—95 |

ABRAHAM RIMENS, *Primary Examiner.*